Patented Aug. 5, 1924.

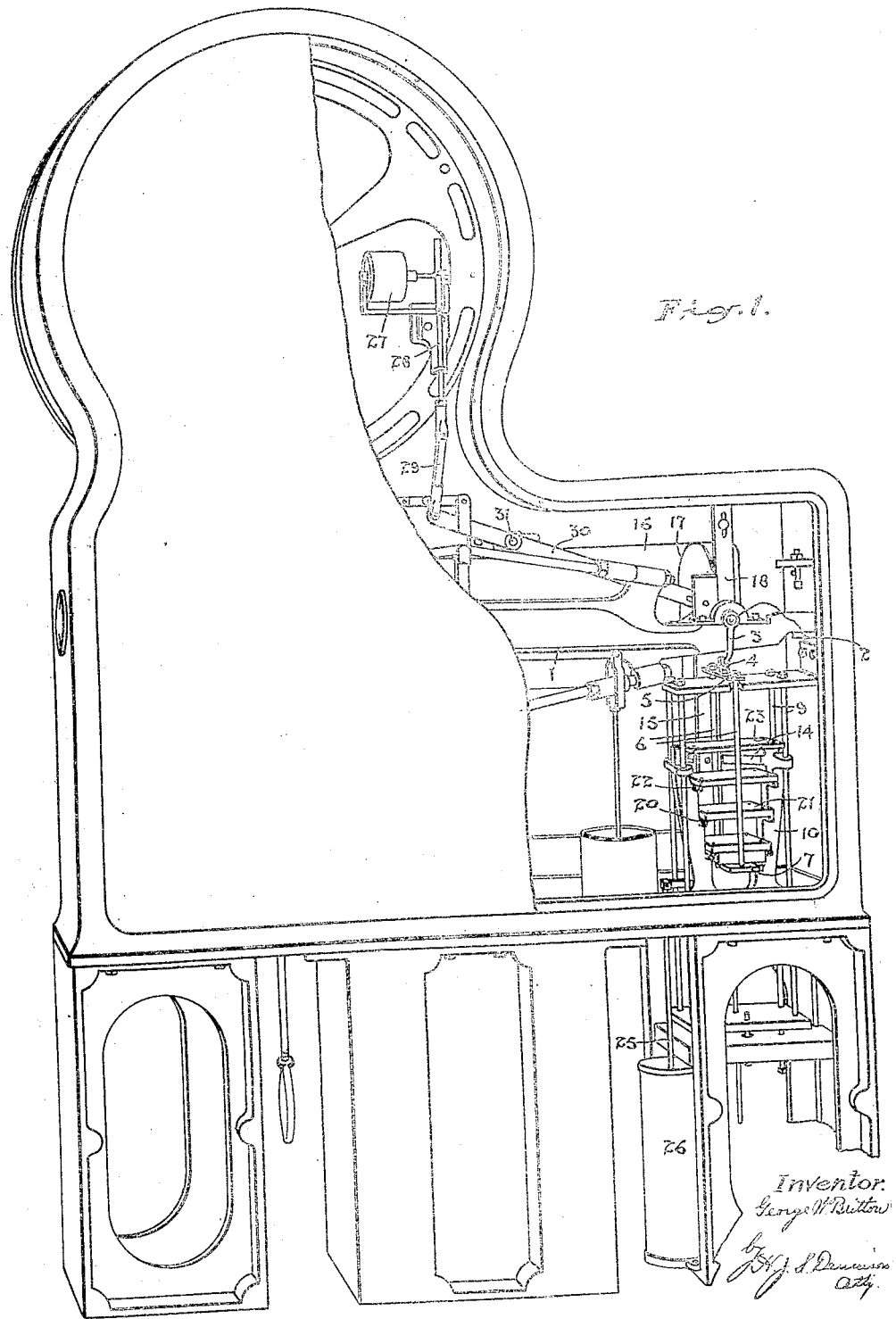

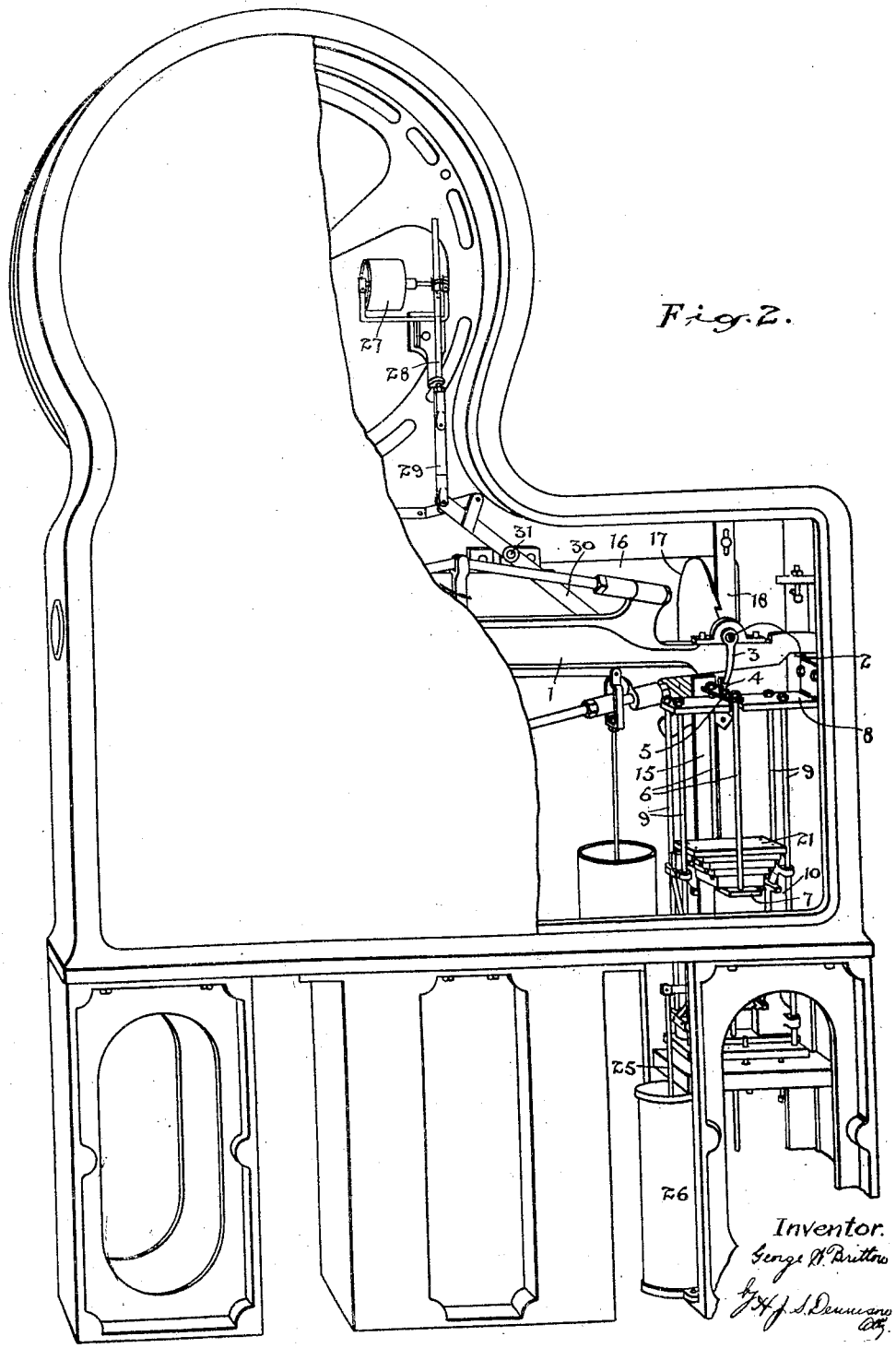

1,504,022

UNITED STATES PATENT OFFICE.

GEORGE W. BRITTON, OF HAMILTON, ONTARIO, CANADA.

WEIGHING SCALE.

Application filed June 25, 1921. Serial No. 480,458.

*To all whom it may concern:*

Be it known that I, GEORGE W. BRITTON, a subject of the King of Great Britain, and resident of the city of Hamilton, county of Wentworth, Province of Ontario, in the Dominion of Canada, have invented certain new and useful Improvements in Weighing Scales, described in the following specification and illustrated in the accompanying drawings, that form part of the same.

The principal objects of this invention are, to facilitate the operation of weighing by providing improved means for changing the counterbalances of the scale beam and to simplify the construction.

Many different forms of apparatus have been devised for depositing extra counterpoises upon the scale beam according to the increase of weight of the load to be measured but this invention contemplates a novel structure which will greatly simplify the device and it consists in the novel construction and arrangement of parts whereby a plurality of counterpoise weights are successively deposited upon the scale beam by a manually operable means slidably supported upon a rigid guide.

In the drawings, Figure 1 is a perspective view from the back of a dial scale equipped with my counterpoise operating attachment, part of the casing of the scale being broken away.

Figure 2 is a view similar to Figure 1 showing the poise weight holder lowered.

Figure 4:
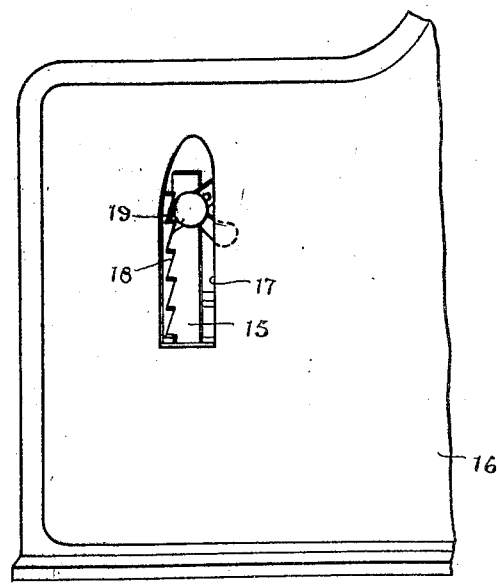
Figure 4 is an elevational view from the front side showing the manually operable means for controlling the supplementary weighing mechanism.
Figure 3:
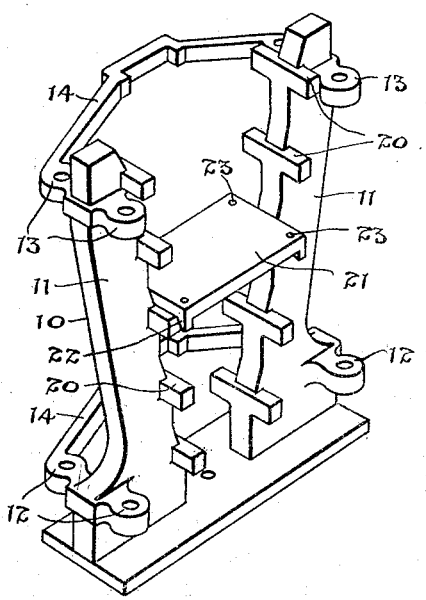
Figure 3 is an enlarged perspective detail of the poise weight holder.

The drawings illustrate a portion of the inner mechanism of a dial scale from the rear side and the beam 1 is provided with knife edge supports 2 at the outer end upon which is suspended the link 3. This link carries a pivotal member 4 to which is secured a cross bar 5.

The cross bar 5 supports a pair of parallelly arranged rods 6, said rods being joined at the bottom by the cross plate 7 and it is upon this cross plate that the counterpoise weights are deposited.

A frame formed of a rigid bracket 8 extending from the casing of the scale extends inwardly into said casing and supports four parallelly arranged rods 9 which are arranged in pairs spaced equidistant from the parallel rods 6.

A cradle member 10 is slidably arranged upon the rods 9, said member being formed of a pair of uprights 11 each provided with pairs of lugs 12 and 13 at the bottom and top respectively, which lugs are bored vertically and are slidably arranged on the vertical rods 9.

The uprights 11 are connected at the top and bottom at one side by the broad V-shaped connecting pieces 14 which are preferably formed integral therewith and to these members is connected a vertical bar 15 by means of which the cradle is moved vertically on its supports.

The front plate 16 of the scale is formed with a slot 17 opposite to the bar 15 and at one side of this slot is arranged a ratchet bar 18.

A pawl 19 is rotatably secured to the upper end of the bar 15 and is adapted to engage the ratchet bar 18, said pawl being weighted to retain engagement with the ratchet bar.

The pawl engaging the teeth of the ratchet bar holds the cradle in certain definite positions on its vertical guides, the purpose of which will be further explained.

The cradle uprights 11 are provided with stepped lugs 20 arranged in opposite pairs, the lower pair being closest together and each succeeding pair being a greater distance apart. These steps are adapted to receive and support a plurality of weights in the form of flat plates 21 each of which is provided with sloping corner lugs 22 to engage the steps and ensure the weight sitting properly thereon. Each of the plates is also provided with tapered indents 23 in the top side at each corner and on the bottom side are arranged suitable pins which are adapted to enter the indents to centralize the plates when they are supported the one upon the other.

In the normal operation of the scale beam within the range of the dial indicator, that is, in weighing loads which do not exceed the capacity of the dial the bar 15 is raised to its uppermost position, thereby raising the cradle to such a position that all the counterpoise weights will be supported by the cradle clear of the plate 7 suspended from the beam. In the event of a load exceeding the capacity of the dial indicator the pawl 19 is turned to release it from the ratchet bar 18 and the bar is moved downwardly one or more notches and as it is moved downwardly the cradle moves down so that the lower poise engages and rests upon the plate 17 on the rods suspended from the beam. This weight is thus added to the bar as a counterpoise. The continued downward movement of the cradle deposits successively the other counterpoises which are kept in alignment by means of the pins and indents 23.

A plunger rod 25 is secured to the bottom of the cradle and extends downwardly into a cylinder 26 which connects as a dash pot to prevent the dropping of the weights suddenly upon the scale mechanism.

The scale is provided with a supplementary indicating mechanism in the form of a drum 27 arranged behind the dial which is rotated by means of a rack and pinion gear to indicate the equivalent weights of the counterpoise added. The rack is operated by a vertically slidable rod 28 to which is connected a link 29 and said link is connected to one end of a lever 30 pivoted intermediate of its length on a pin 31. This lever is connected at its other end to the spindle of the pawl 19 carried by the bar 18, said lever being slotted to receive the pin and to slide thereon. The drum indicator is thus operated to show on the face of the dial the counterpoises added to the scale beam. The mechanism of the dial indicator and its connection with the scale beam is not shown as such does not form a part of this invention.

What I claim as my invention is :—

1. In a weighing scale, the combination with the rigid scale frame and scale beam, of rigid vertical guides arranged in the frame, a cradle member slidable on said vertical guides and having stepped supports, a plurality of counterpoise weights of graduated lengths adapted to rest separately on said stepped supports, and a member suspended from the beam between said stepped supports and adapted to receive said counterpoise weights upon the lowering of the cradle member.

2. In a weighing scale, the combination with the rigid scale frame and scale beam, of two pairs of vertical rods rigidly supported in the frame, a cradle member slidably engaging said rods and formed of a pair of uprights each having a plurality of stepped lugs oppositely arranged, counterpoise plates of graduated lengths adapted to rest on their respective stepped lugs and to span the space between the uprights, said plates having guides on the under sides to engage the lugs, a pair of rods pivotally suspended from the scale beam and extending downwardly on opposite sides of said counterpoise weights, a plate secured to the lower ends of said suspended rods and extending transversely between the uprights, and means for lowering and raising said cradle member on its guides for depositing and lifting said weights on and from the suspended plate.

3. In a weighing scale, the combination with the rigid scale frame having a slot and the scale beam, of vertical guides rigidly secured in said frame, a cradle member slidable on said vertical guides, a plurality of counterpoise weights carried by said cradle, a member suspended from the beam adapted to receive said counterpoise weights successively from said cradle as it is operated on said guides, a vertical bar secured to said cradle, a pawl carried on said bar and extending through the slot in the frame, and ratchet teeth adapted to engage said pawl.

4. In a weighing scale, the combination with the scale mechanism having a drum for indicating weights in excess of the dial indicator, of a member slidably arranged within the scale frame and supporting a plurality of counterpoise weights, means suspended from the scale beam for receiving said counterpoise weights upon sliding said member, a slot in the scale frame, a pawl connected with said sliding member extending through the slot in the frame, a ratchet rack adapted to engage said pawl, and a lever connected to said slidable member and operatively connected with the mechanism for rotating said excess weight indicator.

GEORGE W. BRITTON.

Witnesses:
EDITH M. FENN,
JOHN N. PEDEN.